(12) United States Patent
Juranitch et al.

(10) Patent No.: US 12,343,658 B2
(45) Date of Patent: *Jul. 1, 2025

(54) DIRTY WATER DISTILLATION AND SALT HARVESTING SYSTEM, METHOD, AND APPARATUS

(71) Applicant: HEAT IP HOLDCO, LLC, Aberdeen (GB)

(72) Inventors: James Charles Juranitch, Fort Lauderdale, FL (US); Alan Craig Reynolds, Novi, MI (US); Raymond Clifford Skinner, Coral Springs, FL (US); Thomas Raymond Juranitch, Delray Beach, FL (US)

(73) Assignee: HEAT IP HOLDCO, LLC, Aberdeen (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,492

(22) Filed: Aug. 3, 2021

(65) Prior Publication Data

US 2022/0023769 A1    Jan. 27, 2022

Related U.S. Application Data

(63) Continuation of application No. 16/461,296, filed as application No. PCT/US2017/062571 on Nov. 20, 2017, now Pat. No. 11,110,370.

(Continued)

(51) Int. Cl.
*B01D 1/14* (2006.01)
*B01D 3/38* (2006.01)
(Continued)

(52) U.S. Cl.
CPC ............... *B01D 1/14* (2013.01); *B01D 3/38* (2013.01); *B01D 5/0039* (2013.01); *B01D 5/006* (2013.01);
(Continued)

(58) Field of Classification Search
CPC .......... B01D 1/14; B01D 3/38; B01D 5/0039; B01D 5/006; B01D 5/0075; C02F 1/10; F01K 13/00
See application file for complete search history.

(56) References Cited

U.S. PATENT DOCUMENTS 2,384,587 A * 9/1945 Badenhausen .......... F01K 21/06
                                                              60/657
3,147,598 A * 9/1964 Wilson ..................... C02F 1/04
                                                              159/48.1

(Continued)

FOREIGN PATENT DOCUMENTS

RU          2150587 A1    6/2006
WO       2014107159 A1    7/2014

*Primary Examiner* — Jonathan Miller
(74) *Attorney, Agent, or Firm* — LAW OFFICE OF JESSE D. LAMBERT, LLC

(57) ABSTRACT

Embodiments of the present disclosure can include a system for harvesting salt and generating distilled water from at least one of a produced water and salt water, comprising. A direct steam generator (DSG) can be configured to generate saturated steam and combustion exhaust constituents from the at least one of the produced water and salt water. A separation system can be configured to separate the salt from at least one of the saturated steam and combustion exhaust constituents in brine form or solid form. An expansion turbine can be configured to recover energy from the steam and combustion exhaust constituents.

17 Claims, 3 Drawing Sheets

Related U.S. Application Data

(60) Provisional application No. 62/424,504, filed on Nov. 20, 2016.

(51) Int. Cl.
    *B01D 5/00*         (2006.01)
    *C02F 1/10*         (2023.01)
    *F01K 13/00*       (2006.01)
    *C02F 103/10*     (2006.01)

(52) U.S. Cl.
    CPC .............. *B01D 5/0075* (2013.01); *C02F 1/10* (2013.01); *F01K 13/00* (2013.01); *C02F 2103/10* (2013.01)

(56) References Cited

U.S. PATENT DOCUMENTS

| | | | |
|---|---|---|---|
| 4,338,199 A * | 7/1982 | Modell | C02F 1/16 210/721 |
| 4,398,604 A | 8/1983 | Krajicek et al. | |
| 4,498,542 A | 2/1985 | Eisenhawer et al. | |
| 4,543,190 A * | 9/1985 | Modell | C02F 1/16 210/721 |
| 4,565,249 A | 1/1986 | Pebdani et al. | |
| 4,604,988 A | 8/1986 | Rao | |
| 5,020,595 A | 6/1991 | Van Slyke | |
| 7,780,152 B2 | 8/2010 | Rao | |
| 7,931,083 B2 * | 4/2011 | Betzer Tsilevich | E21B 43/24 166/267 |
| 11,110,370 B2 * | 9/2021 | Juranitch | C02F 1/10 |
| 2014/0021030 A1 * | 1/2014 | Schubert | B01D 5/0015 202/185.1 |
| 2014/0123620 A1 * | 5/2014 | Huntington | F02C 3/04 60/39.52 |
| 2014/0137779 A1 | 5/2014 | Pronske et al. | |
| 2014/0158517 A1 * | 6/2014 | Shirley | C02F 1/048 203/10 |
| 2014/0190817 A1 * | 7/2014 | Mays | F01K 13/006 203/10 |
| 2015/0090457 A1 * | 4/2015 | Harrison | E21B 37/06 166/305.1 |
| 2015/0369025 A1 | 12/2015 | Latimer et al. | |
| 2016/0319702 A1 * | 11/2016 | Martindale | F01K 7/165 |
| 2019/0153303 A1 * | 5/2019 | Riley | B01F 35/2134 |

\* cited by examiner

DIRTY WATER DISTILLATION AND SALT HARVESTING SYSTEM, METHOD, AND APPARATUS

CROSS-REFERENCE TO RELATED APPLICATIONS

This application is a continuation of U.S. application Ser. No. 16/461,296, filed 15 May 2019 (the '296 application), which is the national stage application of International application no. PCT/US2017/062571, filed 20 Nov. 2017 (the '571 application) and published under International publication no. WO 2018/094338A1 on 24 May 2018. This application claims the benefit of U.S. provisional application no. 62/424,504, filed 20 Nov. 2016 (the '504 application). The '296 application, '571 application and the '504 application are all hereby incorporated by reference in their entirety as though fully set forth herein

FIELD OF THE INVENTION

Embodiments of the present disclosure relate generally to a method, apparatus and system for the cost-effective distillation of dirty water and the parallel harvesting of salts and other valued inorganic product. The system, apparatus and method can be used in the enhanced oil recovery industry in processes such as Hydraulic Fracturing, or any other application which requires large quantities of distilled water and has available brine or salt laden water.

BACKGROUND

The Hydraulic Fracturing hydrocarbon recovery process has proven to be an effective way of recovering fossil energy. It is not without negative issues. One of the undesirable traits of the process is its need for large quantities of water in the beginning of the process. A typical well will require 3 million to 5 million gallons of water in the beginning or injection part of a fracing process. Clean water is preferred for this process. There is a larger disposal requirement to dispense with fossil water or salt laden brine water which is returned during the balance of the hydrocarbon recovery process. This fossil water is known as "produced water" and contains large amounts of salts. In some cases, over 200,000 ppm of salts. For every barrel of oil recovered in a Fracing operation there is typically between 3 to 10 barrels of produced water that needs to be disposed of. To date, the current practice for produced water disposal is deep well injection. The produced water is effectively pumped deep into the ground. Unfortunately, it appears this process has precipitated seismic events or earth quakes in a number of locations. A better more effective method of produced water disposal such as the one taught in this disclosure is needed.

SUMMARY

Embodiments of the present disclosure can include a system for harvesting salt and generating distilled water from at least one of a produced water and salt water, comprising. A direct steam generator (DSG) can be configured to generate saturated steam and combustion exhaust constituents from the at least one of the produced water and salt water. A separation system can be configured to separate the salt from at least one of the saturated steam and combustion exhaust constituents in brine form or solid form. An expansion turbine can be configured to recover energy from the steam and combustion exhaust constituents.

Embodiments of the present disclosure can include a system for harvesting salt and generating distilled water from at least one of a produced water and salt water. A direct steam generator (DSG) can be configured to generate saturated steam and combustion exhaust constituents from the at least one of the produced water and salt water. A separation system can be configured to separate the salt from at least one of the saturated steam and combustion exhaust constituents in brine form or solid form. An expansion turbine can be configured to recover energy from the steam and combustion exhaust constituents.

DETAILED DESCRIPTION

Embodiments of the present disclosure relate generally to a method, apparatus and system for the cost-effective distillation of dirty water and parallel salt harvesting. The system, apparatus and method can be used in the enhanced oil recovery industry in processes such as Hydraulic Fracturing, or any other application which requires large quantities of distilled water and has available brine or salt laden water.

Figure 1:
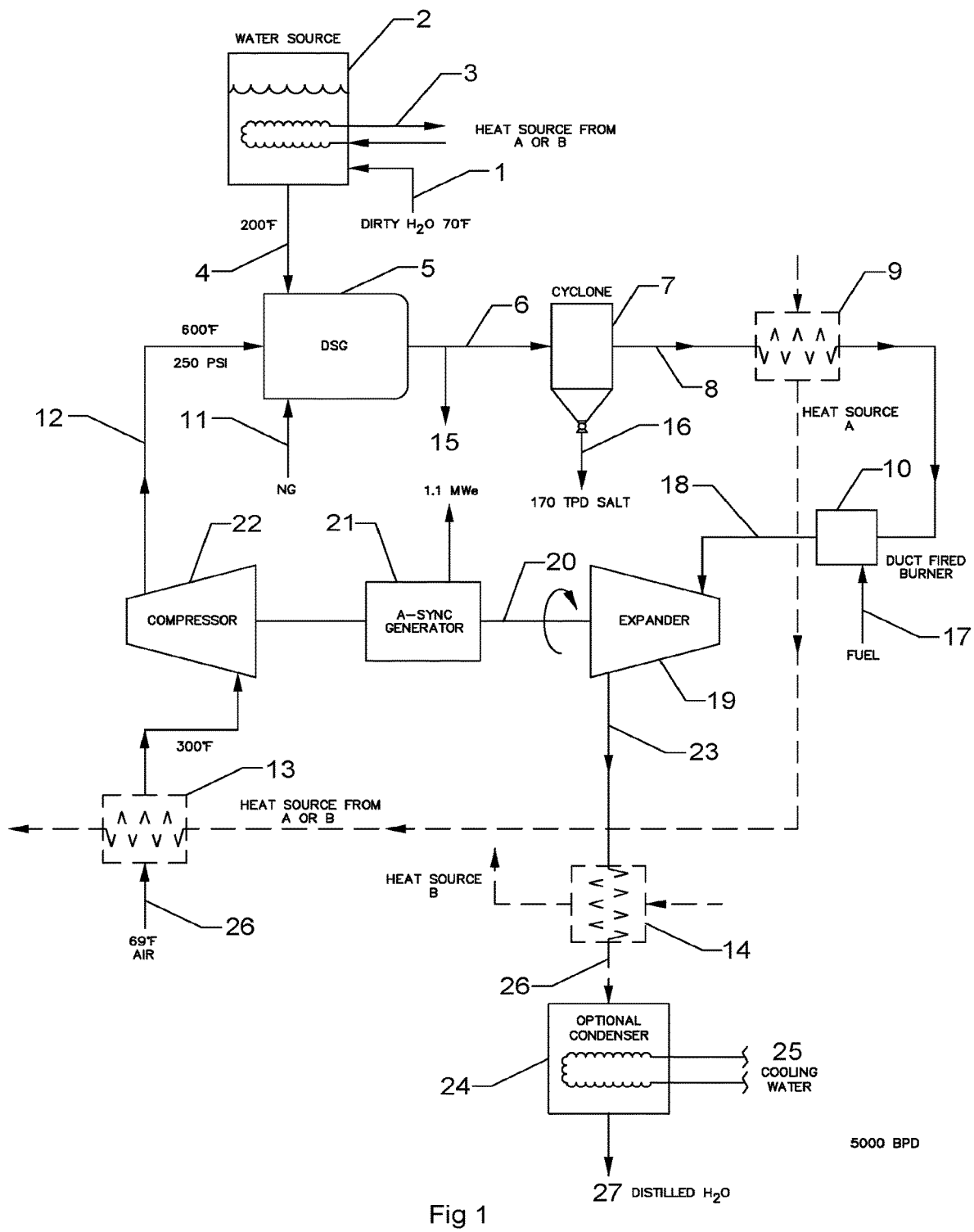
FIG. 1 depicts a simplified schematic representation of a dirty water distillation system, salt harvesting method, and apparatus, in accordance with embodiments of the present disclosure.

FIG. 1 depicts a simplified schematic representation of a dirty water distillation system, salt harvesting method, and apparatus, in accordance with embodiments of the present disclosure. In FIG. 1, dirty water or salt laden produced water from fracing operations or other salt water intensive processes enters the process in conduit 1. As depicted, the water can have a temperature of 70 degrees Fahrenheit (F), although the temperature of the water can be less than or greater than 70 degrees F. The produced water can be heated in optional tank 2 with optional heat exchanger 3. The heat energy can come from optional heat sources A or B (e.g., heat sources 9 or 14). The pre-heated produced water in conduit 4 is brought to as high a temperature as possible without boiling. For standard conditions the produced water can be heated to approximately 210 degrees F. Conduit 4 is in communication with a direct steam generator 5 as described in U.S. provisional patent application No. 62/381,983, which is incorporated by reference as though fully set forth herein. The direct steam generator (DSG) 5 is configured to operate on compressed oxidant, which can be provided via conduit 12 and a hydrocarbon fuel provided via conduit 11. In some embodiments, energy in an amount of approximately 29 megawatts can be introduced into the DSG, although the amount of energy can be greater than or less than 29 megawatts. The hydrocarbon fuel can be flair gas also known as casing head gas or it can be any other available fuel, such as natural gas. The oxidant can be air or an oxygen enriched air from an enriched level of oxygen in a range from 20% oxygen by volume to 100% oxygen by volume. In embodiments of the present disclosure, non-enriched air can be used as the oxidant. The air can be compressed to increase efficiency and heat transfer. The pressure of the air oxidant can be in a range from 30 pounds per square inch absolute (psia) to 2,000 psia. A preferred pressure of the air oxidant can be in a range from 60 psia to 700 psia, and more specifically in a range from 60 psia to 280 psia. In an example, and as depicted, the air oxidant can have a pressure of approximately 250 psia, although embodiments are not so limited. The oxidant temperature of the oxidant flowing through conduit 12 should be as high as possible and can be in a range from 200 degrees F. to 1,000 degrees F., in some embodiments. A preferred temperature of the oxidant flowing through conduit 12 can be in a range from 400 degrees F. to 600 degrees F. The DSG can be operated in a steam generation condition where blowdown is created in conduit 15 or cyclone exit 16, which would produce a high concentration brine. A blowdown level can be from 2% to 30% with a preferred range of 3% to 10%. The steam, DSG exhaust, and solids in conduit 6 can also be created to contain from 100% quality steam to a superheated steam condition. Steam in this condition can precipitate the salts from the feedwater as solids. The salt solids can be separated from the steam in cyclone 7 and can flow out of the exit conduit 16. In an example of a 5,000 barrel per day system with 250,000 ppm salt solids and other valued inorganic material, the system can harvest approximately 170 tons per day of salt and valued material through exit conduit 16. This product has significant value and supports the economic viability of this process. Other valued inorganic material typically found in produced water can be lithium, silver, magnesium, aluminum and many other elements, which can be harvested via embodiments of the present disclosure.

Steam energy in conduit 8 can be extracted in an optional heat recovery system 9, which can include a heat exchanger, for example. Optional duct fired burner 10 or other type of heat source can be used to optimize energy content in the system. For example, the duct fired burner 10 can add heat energy to the steam and DSG exhaust traveling through conduit 18. Fuel conduit 17 delivers fuel to the duct fired burner which can be casing head gas or any other available fuel.

The steam and DSG exhaust in conduit 18 are processed through expansion turbine 19 to turn shaft 20. Optional asynchronous or synchronous generator 21 can be used to generate electricity from the extracted energy from expansion turbine 19. As depicted, the asynchronous or synchronous generator 21 can produce approximately 1.1 MWe of energy, although examples are not so limited and a greater or lesser amount of energy can be produced by the generator 21. Compressor 22 is used to compress DSG oxidant, which in this example is air. The air enters in conduit 26 and may be preheated with recovered energy from sources A or B in heat transfer system 13 (e.g., heat exchanger). In an example, and as depicted, the air can be at a temperature of 69 degrees F., although the temperature of the air can be less than or greater than 69 degrees F. The energy transferred via heat transfer system 13 may be modulated to control the DSG oxidant supply at a maximum desired temperature when the included heat of compression through compressor 22 is integrated. In this example 600 degrees F. is the desired control point for the inlet temperature of the oxidant supply to the DSG when the energy is summed from the ambient air, the energy recovered via heat transfer system 13 and the heat of compression generated from the compressor 22. However, embodiments are not so limited and the inlet temperature of the oxidant supply to the DSG can be less than or greater than 600 degrees F., as further discussed herein.

The remaining stored energy in conduit 23 from the expansion turbine 19 may be recovered in heat exchanger 14 which is denoted as heat source B. An optional condenser 24 with its cooling towers 25 may be used to fully condense the steam in conduit 33 to form distilled water which would exit conduit 27.

Figure 2:
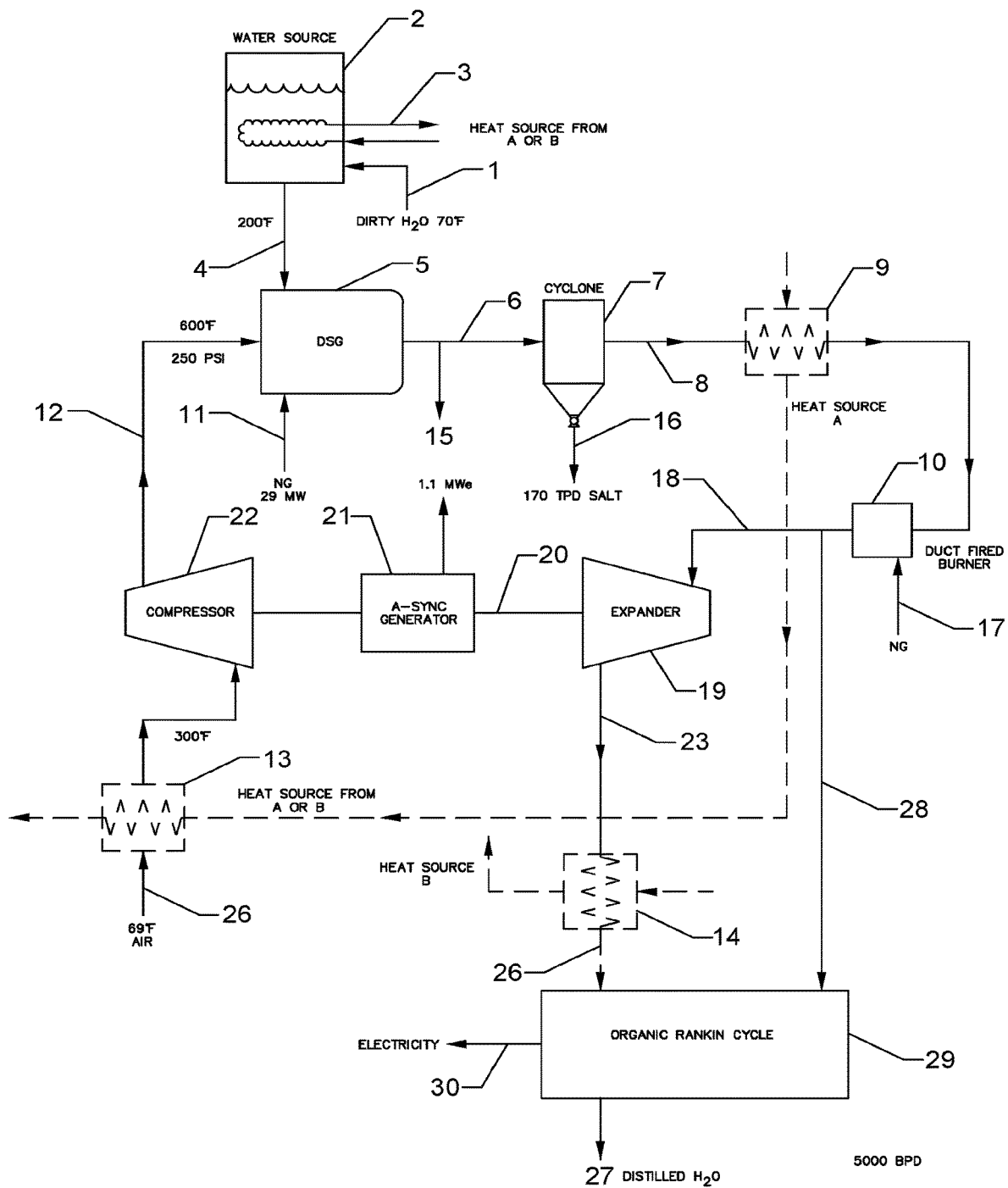
FIG. 2 depicts a second schematic representation of a dirty water distillation system, salt harvesting method, and apparatus that includes a Rankine cycle generator system, in accordance with embodiments of the present disclosure.

FIG. 2 depicts a second schematic representation of a dirty water distillation system, salt harvesting method, and apparatus that includes a Rankine cycle generator system, in accordance with embodiments of the present disclosure. FIG. 2 shows the same basic system as depicted in FIG. 1 with the same basic elements, as denoted by a "prime" symbol indicating the same basic elements. For example, the DSG 5 can be the same or similar to the DSG 5'. In some embodiments, the system can include the addition of an optional Rankine cycle generator system or an optional Organic Rankine cycle generation system 29. For example, FIG. 2 includes the same or similar features as FIG. 1, as denoted by the reference numerals, with the exception that FIG. 2 depicts the addition of an optional Rankine cycle generator system or the optional Organic Rankine cycle generation system 29. The optional Rankine cycle generator system or the optional Organic Rankine cycle generator system 29 can be fed energy in the form of DSG exhaust, steam and/or steam condensate from conduit 33' and/or conduit 28. For example, DSG exhaust, steam and/or steam condensate can be provided to the optional Rankine cycle generator system or the optional Organic Rankine cycle generator system 29 solely via conduit 33' or conduit 28 or provided via conduits 33' and 28 combined. In some embodiments, electricity 30 can be generated via the optional Rankine cycle generator system or the optional Organic Rankine cycle generator system 29.

In FIG. 2, dirty water or salt laden produced water from fracing operations or other salt water intensive processes enters the process in conduit 1'. As depicted, the water can have a temperature of 70 degrees Fahrenheit (F), although the temperature of the water can be less than or greater than 70 degrees F. The produced water can be heated in optional tank 2' with optional heat exchanger 3'. The heat energy can come from optional heat sources A or B (e.g., heat sources 9' or 14'). The pre-heated produced water in conduit 4' is brought to as high a temperature as possible without boiling. For standard conditions the produced water can be heated to approximately 210 degrees F. Conduit 4' is in communication with a direct steam generator 5' as previously described. The direct steam generator (DSG) 5' is configured to operate on compressed oxidant, which can be provided via conduit 12' and a hydrocarbon fuel provided via conduit 11'. In some embodiments, energy in an amount of approximately 29 megawatts can be introduced into the DSG, although the amount of energy can be greater than or less than 29 megawatts. The hydrocarbon fuel can be flair gas also known as casing head gas or it can be any other available fuel, such as natural gas. The oxidant can be air or an oxygen enriched air from an enriched level of oxygen in a range from 20% oxygen by volume to 100% oxygen by volume. In embodiments of the present disclosure, non-enriched air can be used as the oxidant. The air can be compressed to increase efficiency and heat transfer. The pressure of the air oxidant can be in a range from 30 pounds per square inch absolute (psia) to 2,000 psia. A preferred pressure of the air oxidant can be in a range from 60 psia to 700 psia, and more specifically in a range from 60 psia to 280 psia. In an example, and as depicted, the air oxidant can have a pressure of approximately 250 psia, although embodiments are not so limited. The oxidant temperature of the oxidant flowing through conduit 12' should be as high as possible and can be in a range from 200 degrees F. to 1,000 degrees F., in some embodiments. A preferred temperature of the oxidant flowing through conduit 12' can be in a range from 400 degrees F. to 600 degrees F. The DSG can be operated in a steam generation condition where blowdown is created in conduit 15' or cyclone exit 16', which would produce a high concentration brine. A blowdown level can be from 2% to 30% with a preferred range of 3% to 10%. The steam, DSG exhaust, and solids in conduit 6' can also be created to contain from 100% quality steam to a superheated steam condition. Steam in this condition can precipitate the salts from the feedwater as solids. The salt solids can be separated from the steam in cyclone 7' and can flow out of the exit conduit 16'. In an example of a 5,000 barrel per day system with 250,000 ppm salt solids and other valued inorganic material, the system can harvest approximately 170 tons per day of salt and valued material through exit conduit 16'. This product has significant value and supports the economic viability of this process. Other valued inorganic material typically found in produced water can be lithium, silver, magnesium, aluminum and many other elements.

Steam energy in conduit 8' can be extracted in an optional heat recovery system 9', which can include a heat exchanger, for example. Optional duct fired burner 10' or other type of heat source can be used to optimize energy content in the system. For example, the duct fired burner 10' can add heat energy to the steam and DSG exhaust traveling through conduit 18'. Fuel conduit 17' delivers fuel to the duct fired burner which can be casing head gas or any other available fuel.

The steam and DSG exhaust in conduit 18' are processed through expansion turbine 19' to turn shaft 20'. Optional asynchronous or synchronous generator 21' can be used to generate electricity from the extracted energy from expansion turbine 19'. As depicted, the asynchronous or synchronous generator 21' can produce approximately 1.1 MWe of energy, although examples are not so limited and a greater or lesser amount of energy can be produced by the generator 21'. Compressor 22' is used to compress DSG oxidant, which in this example is air. The air enters in conduit 26' and may be preheated with recovered energy from sources A or B in heat transfer system 13' (e.g., heat exchanger). In an example, and as depicted, the air can be at a temperature of 69 degrees F., although the temperature of the air can be less than or greater than 69 degrees F. The energy transferred via heat transfer system 13' may be modulated to control the DSG oxidant supply at a maximum desired temperature when the included heat of compression through compressor 22' is integrated. In this example 600 degrees F. is the desired control point for the inlet temperature of the oxidant supply to the DSG when the energy is summed from the ambient air, the energy recovered via heat transfer system 13' and the heat of compression generated from the compressor 22'. However, embodiments are not so limited and the inlet temperature of the oxidant supply to the DSG can be less than or greater than 600 degrees F., as further discussed herein.

The remaining stored energy in conduit 23' from the expansion turbine 19' may be recovered in heat exchanger 14' which is denoted as heat source B. As previously discussed, the optional Rankine cycle generator system or the optional Organic Rankine cycle generator system 29 can be fed energy in the form of DSG exhaust, steam and/or steam condensate from conduit 33' and/or conduit 28. For example, DSG exhaust, steam and/or steam condensate can be provided to the optional Rankine cycle generator system or the optional Organic Rankine cycle generator system 29 solely via conduit 33' or conduit 28 or provided via conduits 33' and 28 combined. In some embodiments, electricity 30 can be generated via the optional Rankine cycle generator system or the optional Organic Rankine cycle generator system 29.

Figure 3:
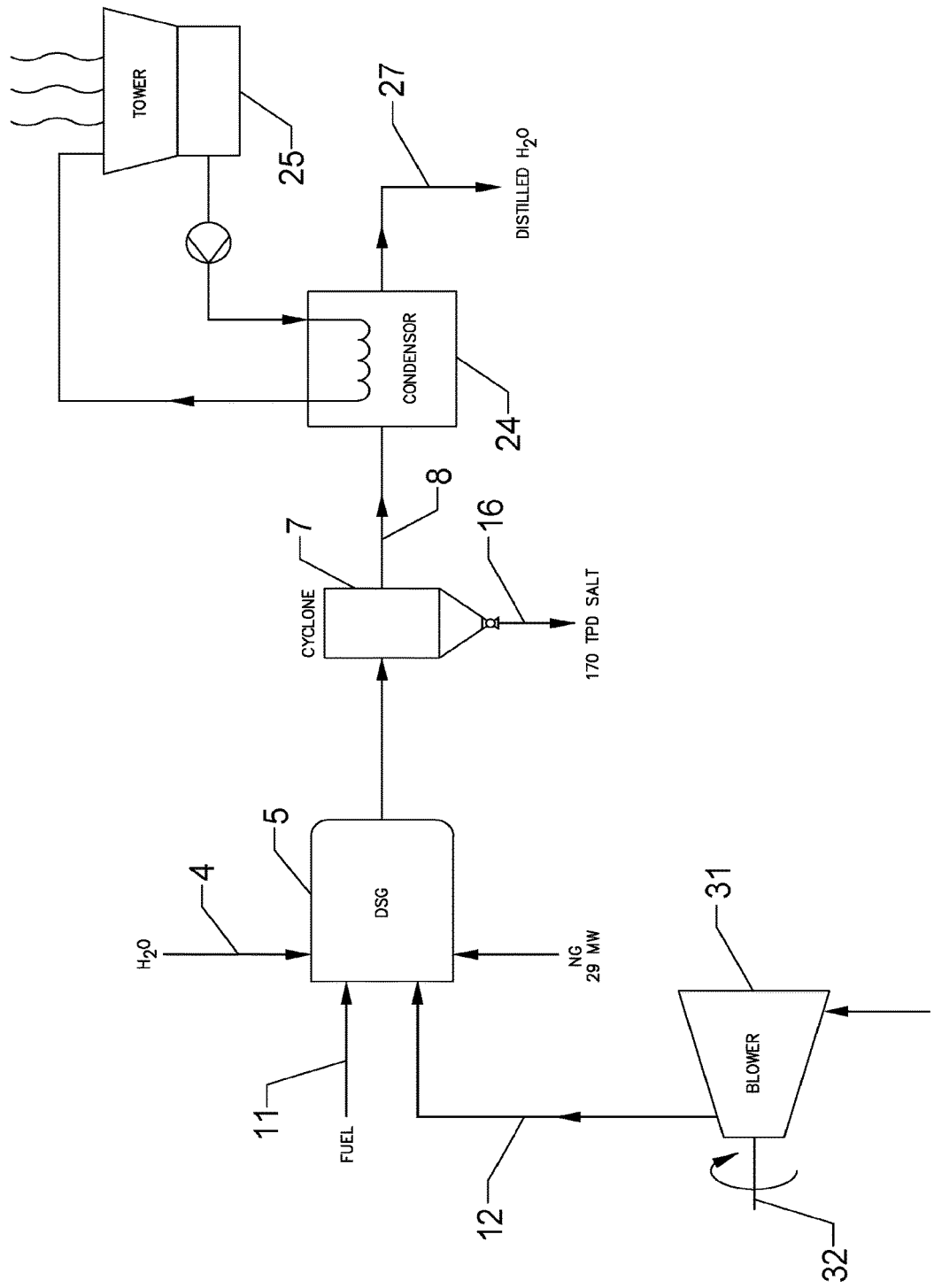
FIG. 3 depicts a third schematic representation of a dirty water distillation system, salt harvesting method, and apparatus, in accordance with embodiments of the present disclosure.

FIG. 3 is a simplified system that communicates the DSG exhaust and steam directly with a condenser 24" to make distilled water in conduit 27" and generates compressed oxidant in conduit 12" for the DSG by using a shaft driven blower or compressor 31". For example, FIG. 3 includes the same or similar features as FIG. 1, as denoted by the reference numerals, which include "primes" to denote similarities, with the exception that the system in FIG. 3 communicates the DSG exhaust and steam directly with a condenser 24" to make distilled water in conduit 27" and generates compressed oxidant in conduit 12" for the DSG by using a shaft driven blower or compressor 31". The power to turn the shaft 32" can be generated from an electric motor driven by a casing head fueled or other hydrocarbon fuel sourced internal combustion generator or Brayton cycle generator. The shaft 32" can also be powered directly by an internal combustion engine or Brayton cycle turbine operating on any fuel such as natural gas, diesel or casing head gas.

As further depicted, an oxidant can be provided via conduit 11" to the DSG 5", as previously discussed with respect to FIG. 1. In some embodiments, water can be provided to the DSG 5" via the water conduit 4" and salt and/or solids can be precipitated from the steam produced by the DSG 5" in the cyclone 7" and can flow out of the exit conduit 16". Steam energy in conduit 8" can flow into the condenser 24", as discussed above. In some embodiments, the condenser 24" can be fluidly/thermally coupled with a cooling tower 25".

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the endoscope of the embodiments, the endoscope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although at least one embodiment for a dirty water distillation and salt harvesting system, method, and apparatus has been described above with a certain degree of particularity, those skilled in the art could make numerous alterations to the disclosed embodiments without departing from the spirit or scope of this disclosure. Additional aspects of the present disclosure will be apparent upon review of Appendix A1. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention claimed is:

1. A system for harvesting salt, and inorganic material, and generating distilled water from at least one of a produced water and salt water, comprising:
   a direct steam generator (DSG) configured to generate superheated steam and combustion exhaust constituents from the at least one of the produced water and salt water;
   a separation system fluidly coupled with the DSG via a conduit, wherein the separation system is configured to separate the salt and a metal selected from the group consisting of lithium, silver, magnesium, and aluminum from at least one of the steam and combustion exhaust constituents in brine form or solid form;
   a steam conduit fluidly coupled with the separation system and an expansion turbine, wherein steam flows from the separation system through the steam conduit, wherein the expansion turbine is configured to recover energy from the steam and combustion exhaust constituents; and
   the at least one of a produced water and a salt water enters the direct steam generator without being pre-heated to a boiling temperature.

2. The system of claim 1, wherein an oxidant for the DSG includes pure air.

3. The system of claim 1, wherein an oxidant for the DSG includes oxygen enriched air that is enriched with up to 100% oxygen by volume.

4. The system of claim 1, wherein a fuel for the DSG includes casing head gas.

5. The system of claim 1, wherein the expansion turbine provides energy for an electrical generator.

6. The system of claim 1, wherein the expansion turbine is configured to provide energy for an oxidant compressor, the oxidant compressor configured to provide an oxidant to the DSG.

7. The system of claim 1, wherein the expansion turbine is configured to provide energy for an electrical generator and at least one of an oxidant compressor and blower.

8. The system of claim 7, wherein at least one of the oxidant compressor and blower is powered by at least one of an electric motor, Brayton cycle turbine, and an internal combustion engine.

9. The system of claim 8, wherein at least one of the Brayton cycle turbine and the internal combustion engine is powered by casing head gas.

10. The system of claim 7, wherein the electricity to power at least one of the oxidant compressor and blower is generated by at least one of a Brayton cycle generator and an internal combustion generator fueled by natural gas or casing head gas.

11. The system of claim 1, wherein a duct fired burner is used to trim the required energy in the system.

12. The system of claim 11, wherein the duct fired burner is fueled by casing head gas.

13. The system of claim 1, wherein heat recovery from the steam is used to maintain an elevated temperature in a feedwater that includes the at least one of the produced water and salt water and an oxidant provided to the DSG.

14. The system of claim 1, further comprising a Rankine cycle generator that is used to generate electricity from the steam generated by the DSG.

15. The system of claim 1, wherein an organic Rankine cycle generator is used to generate electricity from the steam generated by the DSG.

16. The system of claim 1, wherein the produced water and salt water is pre-heated to a temperature below a boiling point in a heat exchanger, before entering the direct steam generator.

17. A system for harvesting salt, and inorganic material, and generating distilled water from at least one of produced water and salt water, comprising:
   a direct steam generator (DSG) configured to generate superheated steam and combustion exhaust constituents from the least one of produced water and salt water;
   a separation system fluidly coupled with the direct steam generator via a conduit, wherein the separation system is configured to separate the salt and a metal selected from the group consisting of lithium, silver, magnesium, and aluminum from the steam and combustion exhaust constituents in brine form or solid form;
   a steam conduit fluidly coupled with the separation system and an expansion turbine, wherein steam flows from the separation system through the steam conduit, wherein the expansion turbine is configured to recover energy from the steam and combustion exhaust constituents; and the at least one of a produced water and a salt water enters the direct steam generator without being pre-heated to a boiling temperature.

\* \* \* \* \*